US007045113B2

(12) United States Patent
Dorfman et al.

(10) Patent No.: US 7,045,113 B2
(45) Date of Patent: May 16, 2006

(54) MO-CU COMPOSITE POWDER

(75) Inventors: Leonid P Dorfman, Sayre, PA (US); Michael J. Scheithauer, Ulster, PA (US); David L. Houck, Towanda, PA (US); Anna T. Spitsberg, Sayre, PA (US); Jeffrey N. Dann, Sayre, PA (US)

(73) Assignee: Osram Sylvania Inc., Danvers, MA (US)

( * ) Notice: Subject to any disclaimer, the term of this patent is extended or adjusted under 35 U.S.C. 154(b) by 678 days.

(21) Appl. No.: 10/247,890

(22) Filed: Sep. 20, 2002

(65) Prior Publication Data

US 2003/0091457 A1    May 15, 2003

Related U.S. Application Data

(62) Division of application No. 09/804,876, filed on Mar. 13, 2001, now abandoned.

(60) Provisional application No. 60/193,023, filed on Mar. 29, 2000.

(51) Int. Cl.
*C01G 3/00* (2006.01)
*C01G 39/00* (2006.01)

(52) U.S. Cl. .................................. 423/593.1; 423/23

(58) Field of Classification Search ............ 423/593.1, 423/23; 501/94
See application file for complete search history.

(56) References Cited

U.S. PATENT DOCUMENTS

| 2,572,300 A | 10/1951 | Arnold et al. ............. 23/51 |
| 5,631,044 A | 5/1997 | Rangaswamy et al. ..... 427/216 |

FOREIGN PATENT DOCUMENTS

| EP | 0 559 229 A1 | 9/1993 |
| EP | 0 774 315 A2 | 5/1997 |
| JP | 64-78684 | 3/1989 |
| JP | 4-371373 | 12/1992 |

OTHER PUBLICATIONS

Machej et al., *Phase Relations in the Cupric Molybdates-Cuprous Molybdates System*, J. Solid State Chem., 31, 145-151 (1980), no month.
Machej et al., Subsolidus Phase diagram of $CU_2O$-CuO-$MoO_3$ System, J. Solid State Chem., 31, 135-143 (1980), no month.
Solonin et al., Conditions of Formation of a Liquid Phase in the Initial Stage of Reduction of W-Mo-Cu-O Oxide Systems, Poroshkovaya Metallurgiya, No. 10 (262), 11-16 (1984), no month.
Solonin et al., Homogeneity of the Refractory Component of the Pseduoalloy Forming During Reduction from the complex Oxide System $WO_3$-$MoO_3$-CuO, Poroshkovaya Metallurgiya, No. 8 (273), 1-5 (1985).
Yih et al., Copper-Matrix Molybdenum Particle Composites Made from Copper Coated Molybdenum Powder, J. Electronic Materials, 24, n. 7, 841-51 (1995).
Skorokhod et al., Reduction of Moybdenum and Copper in a Binary Oxide System Poroshkovaya Metallurgiya, No. 2 (242), 1-6 (1983).
Skorokhod et al., *Effect of Various Methods of Charge Preparation on Sinterability in the Molybdenum-Copper System*, Poroshkovaya Metallurgiya, No. 3 (343). 32-36 (1983), no month.
Landau et al., *Sintering Kinetics of Finely Divided Molybdenum-Copper Composites*, Poroshkovaya Metallurgiya, No. 9 (309), 13-16 (1988).
Arikawa et al., *Mechanical Properties of Cu-Mo Composites*, J. Soc. Mat. Sci., Japan, 48, n. 3, 295-300 (Mar. 1999).
Kumar et al., *Consolidation of Nano-Composites for Thermal Management*, Materials and Manufacturing Processes, 11, n. 6, 1029-1041 (1996), no month.
Translation, Skorokhod et al., *Disperse Powders of Refractory Metals*, Ukrainian SSR Acadamedy of Sciences Institute for Problems in Materials Science, Order of the Red Banner of Labor, 12-13, 100-101 (Kiev Naukova Dumka 1979).
Translation, Skorokhod et al., *Chemical Diffusion and Rheological Processes In the Technology of Powdered Materials*, 100-101, 104-105, 216-219 (1990).
Casadonte et al., Sonochemical Production od Intermetallic Coatings in Heterogeneous Media, Ultrasonics, vol. 32, No. 6, (1994) 477-480, no month.
Abstract, CA 83:16341, Zhukovskii et al., Kinetics of the Solid-Phase Synthesis of Copper Molybdates (1975), no month Izvestiya Vysshikh Uchebuykh Zavedenii, Khimya: Khimicheskaya Tek. 18(1) pp. 26-29.
Abstract, CA 119:171726, Suzuki et al., Electrically Conductive Paste Containing Copper and Tungsten and/or Molybdenum, Electric Conductor, and Ceramic Laminated Substrate for Circuit Boards, Japan Patent 5-144316, Jun., 1993.

*Primary Examiner*—Steven Bos
(74) *Attorney, Agent, or Firm*—Robert F. Clark (57) ABSTRACT

A Mo—Cu composite powder is provided which is comprised of individual finite particles each having a copper phase and a molybdenum phase wherein the molybdenum phase substantially encapsulates the copper phase. The composite powder may be consolidated by conventional P/M techniques and sintered without copper bleedout according to the method described herein to produce Mo—Cu pseudoalloy articles having very good shape retention, a high sintered density, and a fine microstructure.

8 Claims, 5 Drawing Sheets

MO-CU COMPOSITE POWDER

CROSS-REFERENCES TO RELATED APPLICATIONS

This application claims the benefit of U.S. Provisional Application No. 60/193,023, filed Mar. 29, 2000. This application is a division of application Ser. No. 09/804,876, filed Mar. 13, 2001 now abandoned.

TECHNICAL FIELD

This invention relates to molybdenum-copper (Mo—Cu) composite powders and in particular to Mo—Cu composite powders used to make components for electronics, electronic packaging, and electrical engineering applications. Examples of such applications include heat sinks, thermal spreaders, electrical contacts, and welding electrodes.

BACKGROUND ART

Mo—Cu pseudoalloys possess properties that are similar to the properties of W—Cu pseudoalloys. However, they have the additional advantages of lower weight and higher workability which makes them better suited for miniaturized electronics.

One conventional method for making articles comprised of Mo—Cu pseudoalloys consists of infiltrating separately sintered porous molybdenum blanks with liquid copper. Infiltrated articles have a solid molybdenum skeleton that functions as the backbone of the pseudoalloy. The skeleton retains the liquid copper during infiltration (and high temperature operation) by capillary forces. One drawback of the infiltration method is that it does not allow near-net or net-shape fabrication of parts. Hence, a number of machining operations are required to obtain the final shape of the infiltrated article.

Other conventional methods for forming Mo—Cu articles include consolidating blends of molybdenum and copper powders by powder metallurgical (P/M) techniques such as hot pressing, explosive pressing, injection molding, tape forming, and rolling. Unlike the infiltration method, these methods do not have a separate step for sintering a molybdenum skeleton. As a result, articles made by P/M methods either completely lack a molybdenum skeleton or have a skeleton of reduced strength. High compacting pressure, repressing, resintering, and sintering under pressure (hot pressing) have been suggested to improve Mo—Mo contacts and the strength of the Mo skeleton. Although P/M techniques allow near-net or net-shape fabrication, sintering articles to full density is complicated by the lack of solubility in the Mo—Cu system, poor wetting of molybdenum by copper, and by copper bleedout from parts during sintering. Furthermore, additions of sintering activators such as nickel and cobalt to improve densification are detrimental to the thermal conductivity of Mo—Cu pseudoalloys, a property which is critical for a number of electronics applications.

In order to improve the homogeneity and density of Mo—Cu pseudoalloys made by P/M methods, Mo—Cu composite powders have been used wherein the molybdenum particles have been coated with copper by chemical deposition or electroplating. However, the copper coating reduces the contact area between molybdenum particles and the strength of the molybdenum skeleton. Moreover, these powders do not prevent copper bleedout from parts during sintering, and hot pressing is still required to improve the sintered density of articles. Thus, it would be advantageous to have a Mo—Cu composite powder which could be used in P/M methods to form net or near-net shaped Mo—Cu articles having strong sintered molybdenum skeletons without copper bleedout.

SUMMARY OF THE INVENTION

It is an object of the invention to obviate the disadvantages of the prior art.

It is another object of the invention to provide a Mo—Cu composite powder with a phase distribution that facilitates the formation of a strong molybdenum skeleton and internal infiltration of the skeleton with liquid copper during sintering.

It is a further object of the invention to provide a Mo—Cu composite oxide powder for producing a Mo—Cu composite powder having a high level of mixing of the metal phases.

It is still a further object of the invention to provide a P/M method of making Mo—Cu pseudoalloy articles with a strong molybdenum skeleton and a high sintered density without copper bleedout.

In accordance with an object of the invention, there is provided a molybdenum-copper composite powder comprising individual finite particles each having a copper phase and a molybdenum phase wherein the molybdenum phase substantially encapsulates the copper phase.

In accordance with another object of the invention, there is provided a method of making a $CuMoO_4$-based composite oxide powder comprising:
 (a) forming a mixture of a molybdenum oxide and a copper oxide, the molybdenum oxide being selected from ammonium dimolybdate, ammonium paramolybdate, or molybdenum dioxide; and
 (b) firing the mixture at a temperature and for a time sufficient to form the $CuMoO_4$-based composite oxide.

In accordance with still another object of the invention, the Mo—Cu composite powder of this invention is made by the method comprising:
 (a) reducing a $CuMoO_4$-based composite oxide powder in a first stage to form an intimate mixture of metallic copper and molybdenum oxides without the formation of low-melting-point cuprous molybdate phases; and
 (b) reducing the intimate mixture in a second stage at a temperature and for a time sufficient to reduce the molybdenum oxides to molybdenum metal.

In another aspect of the invention, there is provided a method for making a Mo—Cu pseudoalloy comprising:
 (a) consolidating a Mo—Cu composite powder to form a compact, the Mo—Cu composite powder having a copper content from about 2 wt. % to about 40 wt. % and comprising individual finite particles each having a copper phase and a molybdenum phase wherein the molybdenum phase substantially encapsulates the copper phase;
 (b) sintering the compact in a first sintering stage at a temperature from about 1030° C. to about 1050° C. to form a molybdenum skeleton;
 (c) sintering the compact in a second sintering stage at a temperature from about 1050° C. to about 1080° C. for a compact made from a composite powder having a copper content of about 26 wt. % to about 40 wt. %, or at a temperature from about 1085° C. to about 1400° C. for a compact made from a composite powder having a copper content of about 2 wt. % to about 25 wt. %.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawings.

We have invented a molybdenum-copper (Mo—Cu) composite powder which comprises finite dual-phase particles each having a copper phase and a molybdenum phase wherein the copper phase is substantially encapsulated by the molybdenum phase. The bulk Mo—Cu composite powders of this invention have the gray color of unalloyed molybdenum powders which is consistent with the substantial encapsulation of the copper phase by the molybdenum phase. Preferably, the Mo—Cu composite powders contain from about 2 wt. % to about 40 wt. % Cu.

In general, the as-reduced Mo—Cu composite powders consist of larger agglomerates (on the order of about 15 µm to about 25 µm in size) of the finite dual-phase particles. Under SEM examination, the finite particles within the agglomerates are shown to be irregularly shaped and have a size in the range of about 0.5 µm to about 1.5 µm. Each of the finite particles has a sintered molybdenum network in which the voids are filled with copper. This unique distribution of Mo and Cu phases provides substantial encapsulation of the Cu phase by the Mo phase and results in the highest level of mixing within the larger agglomerates.

Because the copper phase is encapsulated by the molybdenum phase, an enhanced sintering process with several desirable features is achieved. These features include: (1) the formation of Mo—Mo particle contacts after pressing the powder, (2) the sintering of a substantially dense Mo skeleton prior to melting of the copper, (3) internal infiltration of the skeleton with liquid copper and retention of copper within the skeleton by capillary forces, and (4) sintering in, the presence of liquid copper without copper bleedout from the compact.

The Mo—Cu composite powders are produced by the chemical synthesis and hydrogen reduction of cupric molybdate-based composite oxide systems having controlled amounts of molybdenum trioxide (MoO$_3$). Generally, cupric molybdate (CuMoO$_4$) is made by a solid phase reaction between MoO$_3$ and CuO or Cu$_2$O in air at 600° C. for 40 hours. However, the copper metal content of CuMoO$_4$ as a percentage the total metal content (Cu+Mo) is quite high, about 40 weight percent (wt. %). This is much higher than the copper content in Mo—Cu pseudoalloys used in some industrial applications. For instance, a copper content of 15 to 25 wt. % is required in Mo—Cu materials for electronic packaging. This problem is solved by transitioning the copper content of the CuMoO$_4$-based composite oxide over a wide range by co-synthesis of varied amounts of a second phase of MoO$_3$. The combination of the CuMoO$_4$ and MoO$_3$ phases lowers the copper content of the composite oxide into the ranges desired for electronics applications. Preferably, the copper content of the CuMoO$_4$-based composite oxide as a percentage of the total metal content may be varied from about 2 wt. % to about 40 wt. %. Unless otherwise indicated, the relative copper content for the composite oxides is expressed herein as a percentage of the total metal content of the oxide.

CuMoO$_4$-Based Composite Oxide Synthesis

The composite oxides were produced by solid phase synthesis. The ratio of solid reactants (copper and molybdenum oxides) was adequate to synthesize end products containing the CuMoO$_4$ phase and a controlled amount of the MoO$_3$ phase. The ratio of the synthesized phases (particularly, the amount of MoO$_3$) controlled the copper content in the CuMoO$_4$-based composite oxides. The general formula of the preferred CuMoO$_4$-based composite oxide may be represented on a mole basis as CuMoO$_4$+xMoO$_3$ where x is from about 29 to 0. The co-synthesized CuMoO4 and MoO$_3$ phases were present in every composite oxide particle which provided a very high level of mixing of the copper and molybdenum.

In the preferred synthesis methods, two combinations of reactants are used: (i) complex molybdenum oxides with copper oxides, in particular, ammonium dimolybdate (ADM, (NH$_4$)$_2$Mo$_2$O$_7$) or ammonium paramolybdate (APM, (NH$_4$)$_6$(Mo$_7$O$_{24}$·4H$_2$O) with cuprous (Cu$_2$O) or cupric (CuO) oxides, and (ii) molybdenum dioxide (MoO$_2$) with cuprous or cupric oxide. At temperatures above 250° C. in air, the complex molybdenum oxides undergo thermal decomposition (e.g., (NH$_4$)$_2$Mo$_2$O$_7$→2MoO$_3$+2NH$_3$+H$_2$O), and Cu$_2$O and MoO$_2$ undergo oxidation to CuO and MoO$_3$. These phase transitions dramatically increase the surface area and surface energy of the reactants which accelerates their solid phase interdiffusion reactions and the formation of CuMoO$_4$-based composite oxides. Thus, the CuMoO$_4$-based composite oxide may be formed by firing a mixture of these oxides at a temperature from about 650° C. to about 750° C. for only about 5 hours.

Silica was selected as the material of choice to contain the solid phase synthesis of the CuMoO$_4$-based composite oxides because molybdenum trioxide wants to react and form molybdates with the majority of other metals and metal oxides traditionally used to make boats and trays for solid phase synthesis processes. The use of silica boats slightly, increased the silica content of the composite oxide compared to the total silica content in the reactants. However, the total silica remained at a low level and is not believed to substantially affect the sinterability of the final Mo—Cu composite powder or the electrical/thermal conductivity of the Mo—Cu pseudoalloy.

The first preferred synthesis method may be illustrated by the reaction involving ADM and Cu$_2$O. The composition of ADM can be represented as (NH$_4$)$_2$O·2MoO$_3$, and the synthesis reaction as:

0.5Cu$_2$O+n[(NH$_4$)$_2$O·2MoO$_3$)]+0.25O$_2$→CuMoO$_4$+ (2n−1)MoO$_3$+2nNH$_3$+nH$_2$O

By varying the factor n in the range of about 15.0 to 0.5, the relative copper content in the CuMoO$_4$-based composite oxides synthesized by the above reaction may be controlled in the range of about 2 wt. % to about 40 wt. %.

EXAMPLE 1

ADM with a median particle size of 198.8 μm and cuprous oxide with a median particle size of 14.5 μm were used as solid reactants in the synthesis of $CuMoO_4$-based composite oxides. (Unless otherwise specified particle sizes were determined using a Microtrac MT, X-100 particle size analyzer.) The total weight of solid reactants in these tests was in the range of 0.5 to 1.0 kg. Blends were prepared in an alumina ball mill. The weight ratio of alumina milling media to the reactants varied in the range of 1.5 to 1.0. The length of milling was 1 hour. The light brown color of the milled blend of oxides was the result of mixing the colors of ADM (white) and $Cu_2O$ (brown). The use of milling is preferred with these reactants because the median particle size of the ADM and APM powders is generally much larger than that of the copper oxides which makes it difficult to obtain a homogenous blend by mechanical mixing alone.

Synthesis was carried out in air in a laboratory furnace with an alumina tube. Silica boats were used as reaction containers. A load of 150 g of the milled oxides produced a bed depth of about 0.5" in the boat. The rate of the furnace temperature increase was 2° C./min. The synthesis temperature was 750° C. with an isothermal hold at this temperature of 5 hours.

Five tests were carried out in which the relative copper content in the synthesized composite oxide was varied in the range of 8 to 40 wt. %.

All of the synthesized composite oxides formed sintered cakes which needed to be ground up in a mortar. The caking was attributed to the high reaction temperature and high diffusion activity of the milled solid reactants, particularly, the in-situ-produced $MoO_3$. The ground materials were screened −100 mesh. The synthesized powders had a green-yellow color characteristic of the $CuMoO_4$-based composite oxides. Elemental and x-ray diffraction (XRD) phase analysis were used for powder characterization. The major XRD peaks associated with the $MoO_3$ (3.26 Å) and $CuMoO_4$ (3.73 Å) phases were used to calculate the XRD peak intensity ratios. Table 1 compares the calculated values for the composite oxides based on the amounts of the reactants with the measured values for the synthesized composite oxides.

TABLE 1

| Calculated Values | | Measured Values | |
|---|---|---|---|
| Relative Copper Content, wt. % | Molar Ratio of $MoO_3/CuMoO_4$ | Relative Copper Content, wt. % | XRD Peak Intensity Ratio of $MoO_3/CuMoO_4$ |
| 8 | 6.616 | 7.6 | 5.23 |
| 16 | 2.477 | 15.5 | 1.48 |
| 24 | 1.097 | 23.8 | 0.94 |
| 32 | 0.404 | 31.7 | 0.38 |
| 40 | 0 | 39.9 | 0.15 |

The correlation between the measured and the calculated values of the relative copper content increased with the copper content of the synthesized powders and was in the range of 95.0% to 99.75%. A good correlation was also observed between the trends for the predicted and the actual ratios of the product phases versus the copper content.

In the second and more preferred synthesis method, a friable $CuMoO_4$-based composite oxide is made from unmilled dehydrated solid reactants, of which at least one reactant undergoes a phase change in the course of synthesis, e.g., in-situ oxidation of $MoO2$ to $MoO_3$ and $Cu_2O$ to CuO. As in the first method, the copper content of the synthesized composite oxide is controlled by varying the reaction stoichiometry. The synthesis reaction uses one mole of CuO or a half mole of $Cu_2O$. For $Cu_2O$, the reaction may be represented as:

$$0.5Cu_2O + nMoO_2 + (0.5n+0.25)O_2 \rightarrow CuMoO_4 + (n-1)MoO_3$$

By varying the factor n in the range of about 30.0 to 1.0, the relative copper content in the $CuMoO_4$-based composite oxides may be controlled in the range of about 2 wt. % to about 40 wt. %. Also, since the median particle size of the molybdenum dioxide and copper oxides is of the same order of magnitude, homogeneous starting blends of the solid reactants could be made by mechanical mixing without milling.

EXAMPLE 2

In this example, $MoO_2$ ($D_{50}$=5.3 μm), $Cu_2O$ ($D_{50}$=14.5 μm), and CuO ($D_{50}$=13.3 μm) were used to make the composite oxides. Starting blends with a total weight of 0.5 to 1.0 kg were made by mixing the oxides in a laboratory V-blender for 30 min. The color of the starting blends ranged from brown ($MoO_2$+$Cu_2O$) to dark brown ($MoO_2$+CuO).

The synthesis was carried out in air using the same hardware as in Example 1. A load of 100 g of the blended oxides produced a bed depth of the material in the boat of about 0.5 inches. The rate of furnace temperature increase was 2° C./min. The synthesis temperature was 650° C. with an isothermal hold of 5 hours at this temperature. The relative copper content in the synthesized composite oxide was varied in the range of 5 to 40 wt. %.

In each case, a uniform loosely sintered cake was formed. The material was very friable, and could be disintegrated into powder by rubbing lightly between one's fingers. The synthesized powders had a green-yellow color characteristic of the $CuMoO_4$-based composite oxides. Powders were screened −100 mesh and subjected to the same analyses described in Example 1. The data, in Table 2 illustrate the properties of the composite oxide powders synthesized from $MoO_2$ and $Cu_2O$ (column A) and $MoO_2$ and CuO (column B).

TABLE 2

| Calculated Values | | Measured Values | | | |
|---|---|---|---|---|---|
| Relative Copper Content, wt. % | Molar Ratio of $MoO_3/CuMoO_4$ | Relative Copper Content, wt. % | | XRD Peak Intensity Ratio of $MoO_3/CuMoO_4$ | |
| | | A | B | A | B |
| 5 | 11.583 | 4.68 | 4.66 | 7.2 | 7.2 |
| 10 | 4.961 | 9.64 | 9.60 | 3.2 | 4.3 |
| 15 | 2.753 | 14.45 | 14.47 | 1.9 | 2.3 |
| 20 | 1.649 | 19.30 | 19.49 | 1.2 | 1.8 |
| 25 | 0.987 | 24.39 | 24.27 | 0.8 | 0.9 |
| 30 | 0.545 | 29.52 | 29.62 | 0.5 | 0.3 |
| 35 | 0.230 | 34.53 | 34.66 | 0.1 | 0.3 |
| 40 | 0 | 39.40 | 39.78 | 0 | 0.1 |

The correlation between the measured and the calculated values of the relative copper content increased with the copper content and was in the range of 93.4% to 99.0%. A good correlation is also observed between the trends for the predicted and the actual ratios of the product phases versus the copper content.

EXAMPLE 3

Additional tests were carried out to demonstrate that the copper content in the $CuMoO_4$-based composite oxides can be adjusted to the specified level by controlling the amount of the copper oxide participating in the synthesis. An excess of 4 wt. % $Cu_2O$, compared to the quantity required by the reaction stoichiometry, was used. Test conditions were exactly the same as in Example 2. Table 3 compares the actual copper content of the synthesized composite oxide with the copper content specified by stoichiometry. The correlation of the actual copper content with the specified values was calculated as a ratio of the actual to the specified copper content.

TABLE 3

| Specified Cu, wt. % | Actual (No Excess $Cu_2O$) | Correlation | Actual (4 wt. % Excess $Cu_2O$) | Correlation |
|---|---|---|---|---|
| 5 | 4.68 | 0.936 | 5.08 | 1.016 |
| 10 | 9.64 | 0.964 | 10.39 | 1.039 |
| 15 | 14.45 | 0.963 | 15.39 | 1.026 |
| 20 | 19.30 | 0.965 | 19.63 | 0.981 |
| 25 | 24.39 | 0.975 | 24.97 | 0.998 |
| 30 | 29.52 | 0.984 | 29.75 | 0.991 |
| 35 | 34.53 | 0.986 | 35.76 | 1.022 |
| 40 | 39.40 | 0.985 | 40.53 | 1.013 |

These results demonstrate that adding an excess of up to 4 wt. % of the copper oxide reactant over that required by stoichiometry can be used to adjust the relative copper content in the resultant composite oxide closer to the specified level.

EXAMPLE 4

The synthesis of a $CuMoO_4$-based composite oxide with a relative copper content of 15 wt. % was performed in a production scale belt furnace. The solid reactants were $MoO_2$ and $Cu_2O$. A 300 kg blend of reactants with a 4 wt. % excess of $Cu_2O$ was made in a production scale V-blender. A 1.5 kg amount of the starting blend produced a material bed depth of about 0.5 inches in a silica tray. The synthesis was carried out in air at an average temperature of 675° C. with an average residence time of about 4 hours. The furnace throughput was about 6 kg of composite oxide per hour. A total of 268 kg of the end product was synthesized. The material was discharged from the silica tray onto a vibrating screen, disintegrated, screened −60 mesh and collected in a hopper. The product was blended in a V-blender and analyzed for particle size distribution and copper content. A sample of the end product was milled, screened −100 mesh and subjected to an XRD analysis. The following product characteristics were obtained:

Particle size distribution:

$D_{90}$=18.5 μm $D_{50}$=5.5 μm $D_{10}$=2.1 μm

Relative copper content: 15.36 wt. %

XRD Peak intensity ratio of $MoO_3/CuMoO_4$: 1.8

The phase composition and copper content of the composite oxide powder synthesized in the production furnace closely reproduced the corresponding properties of powders synthesized in the laboratory.

Reduction of $CuMoO_4$-Based Composite Oxides

One of the key problems which exists in the conventional methods involving the co-reduction of mechanically blended mixtures of oxide powders stems from the significant difference between the reduction temperatures of the oxides of molybdenum and copper. This difference causes a premature appearance of copper and its segregation by coalescence. This in turn results in an inhomogeneous distribution of the Mo and Cu phases in the reduced Mo—Cu composite powders. In contrast, the Mo—Cu composite powders produced by the hydrogen reduction of the synthesized $CuMoO_4$-based composite oxides exhibit very good homogeneity. The atomic level of contact between the copper and molybdenum in the synthesized $CuMoO_4$-based composite oxides and the difference in the reduction temperatures can be used to advantage by controlling the order of appearance of the metal phases thereby resulting in a homogeneous Mo—Cu composite metal powder comprised of individual dual-phase particles in which the Mo phase substantially encapsulates the Cu phase.

In a preferred method, the hydrogen reduction of the $CuMoO_4$-based composite oxides is performed in two stages. The first stage reduction is performed at a temperature from about 250° C. to about 400° C. and causes the reduction of copper from the composite oxides thereby yielding an intimate mixture of metallic copper and molybdenum oxides. The second stage reduction is performed at a higher temperature, from about 700° C. to about 950° C., and causes the reduction of the molybdenum oxides to molybdenum metal which results in the formation of the dual-phase particles and the substantial encapsulation of the copper phase by the molybdenum phase.

The two-stage reduction is preferred because the hydrogen reduction of the $CuMoO_4$ phase is complicated by disproportionation of cupric molybdate into cuprous molybdates, $Cu_6Mo_4O_{15}$ and $Cu_2Mo_3O_{10}$, which have relatively low melting points (466° C. and 532° C., respectively). The formation of these phases at the initial stage of hydrogen reduction is detrimental as it fuses the powder and obstructs the reduction process. It was discovered that the formation of these liquid phases can be prevented by taking advantage of the high thermodynamic probability that the copper in the $CuMoO_4$-based composite oxides may be reduced at temperatures below the melting points of the cuprous molybdates. Using the lower reduction temperatures in a first-stage reduction eliminates the formation of the low-melting-point cuprous molybdates and produces an intimate mixture of Mo oxides and metallic copper. Although traces of other molybdates, $Cu_3Mo_2O_9$ and $Cu_6Mo_5O_{18}$, have been identified as forming in the course of the first stage hydrogen reduction, these molybdates have a high temperature stability and do not cause any complications.

In the second stage, the molybdenum oxides are reduced to molybdenum metal. The conventional method for reducing Mo from its trioxide typically involves two steps which are carried out in different temperature ranges. First, $MoO_3$ is reduced to $MoO_2$ at 600–700° C. and then the $MoO_2$ is reduced to Mo at 950–1100° C. However, in the reduction of $CuMoO_4$-based oxide composites, there appears to be a catalytic effect caused by the freshly reduced Cu phase being in close contact with the Mo oxides. This results in a lowering of the temperature of the $MoO_3 \rightarrow MoO_2$ reduction step to 350–400° C., and the $MoO_2 \rightarrow Mo$ reduction step to 700–950° C. In addition, the presence of the Cu phase leads to the deposition of Mo on Cu which inhibits the coalescence and growth of copper particles and causes the gradual encapsulation of the Cu phase by the Mo phase. This mechanism is believed to contribute to controlling the size and homogeneity of the composite Mo—Cu particles.

After the second reduction stage, the as-reduced Mo—Cu composite powders may require passivation to reduce their tendency toward oxidation and pyrophoricity. In particular, it was discovered that oxidation and pyrophoricity of the as-reduced Mo—Cu composite powders with an oxygen content below 5000 ppm may be suppressed by passivation of the powders for 1 to 2 hours with nitrogen immediately after removal from the furnace.

The following examples illustrate the reduction of the synthesized $CuMoO_4$-based composite oxides to form the Mo—Cu composite powders of this invention.

EXAMPLE 5

A first stage reduction of a $CuMoO_4$-based composite oxide having a relative copper content of 15 wt. % was carried out in a laboratory furnace with flowing hydrogen. An oxide load of about 150 g produced a material bed depth of about 0.5 inches in the Inconel boat. The reduction temperatures were 150, 200, 300, and 400° C. The rate of furnace temperature increase was 5° C./min, and the isothermal hold at the reduction temperature was 4 hours. The resulting products were screened −60 mesh and subjected to an XRD analysis.

No low-melting-point cuprous molybdates ($Cu_6Mo_4O_{15}$ or $Cu_2Mo_3O_{10}$) were detected in the reduction products. Minor $Cu_3Mo_2O_9$ and $Cu_6Mo_5O_{18}$ phases were detected in products reduced in the 150–200° C. temperature range. The reduction of copper appears to begin at about 200° C. and is complete at about 300° C. The major phases in the material reduced at 300° C. were Cu, $MoO_2$, and $MoO_3$. Apparently, underreduced $MoO_3$ in the material is quite active and undergoes an exothermic, partial hydration when exposed to air. This required that the product reduced at 300° C. be cooled in air for about 20 to 30 min. Once cooled, the reduced product which had a dark gray color could be easily screened −60 mesh. The major phases of the product reduced at 400° C. were Cu and $MoO_2$. In this case, the product temperature did not increase after exposure to air. The product reduced at 400° C. was caked and required disintegration to turn it into a powder that could be screened −60 mesh.

EXAMPLE 6

A first stage reduction of the same $CuMoO_4$-based composite oxide used in Example 5 was performed in a large production-scale hydrogen reduction furnace having three heating zones. An oxide load of about 2 kg produced a material bed depth of about 0.5 inches in an Inconel tray. In the first test, all zone temperatures were set at 300° C. In the second test, all zone temperatures were set at 400° C. The residence time for the material in the furnace was about 4 hours. The end products were screened −60 mesh and subjected to an XRD analysis.

Figure 1:
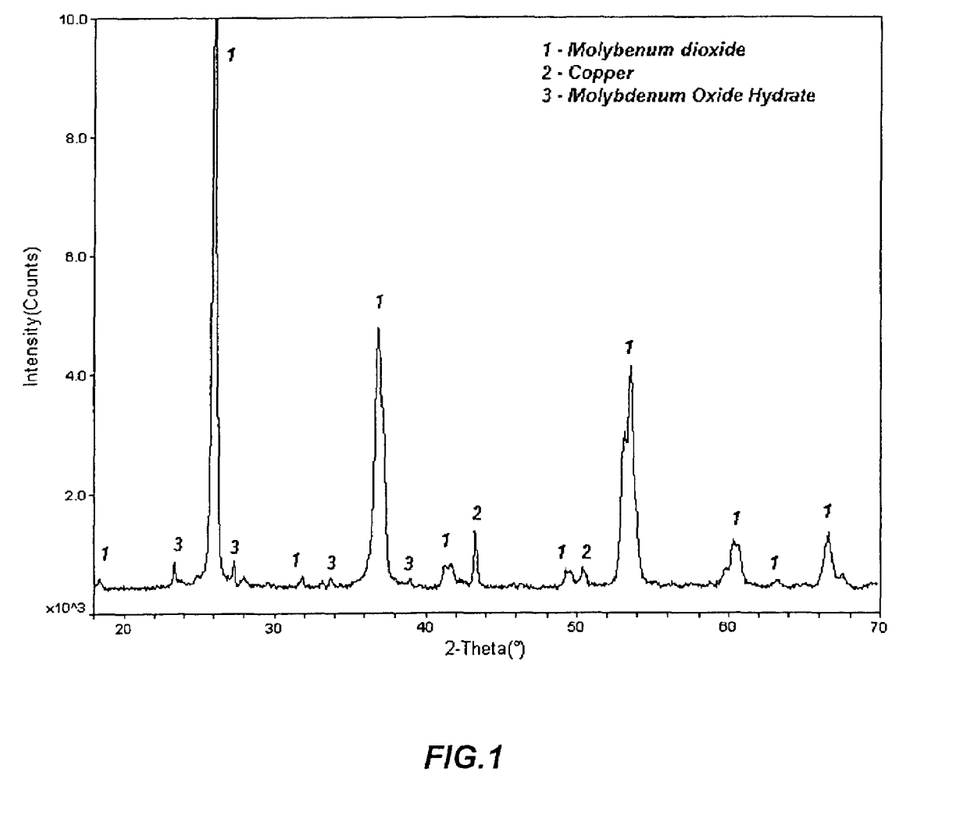
FIG. 1 is an x-ray diffraction pattern of a first stage reduction product formed by the hydrogen reduction at 300° C. of a CuMoO$_4$-based composite oxide powder having a relative copper content of 15 wt. %.

After removal from the furnace, the temperature of the product from the first test increased requiring cooling in air for about 30–45min. The major phases in the reduced product were Cu and $MoO_2$. The minor phases consisted of various hydrated molybdenum trioxide phases. FIG. 1 illustrates the XRD pattern for this material. The appearance of the product closely resembled the material obtained in Example 5 at 300° C. The major phases in the reduced product from the second test were Cu and $MoO_2$. Traces of the hydrated molybdenum trioxide phases were also present. The appearance of the product also closely resembled the material obtained in Example 5 at 400° C.

EXAMPLE 7

A two-stage hydrogen reduction of the synthesized $CuMoO_4$-based composite oxides having a relative copper content in the range of 5 to 40 wt. % was performed. The same hardware, loading conditions, and rate of temperature increase as in Example 5 were used. The reduction temperatures were 300° C. (first stage) and 700° C. (second stage) with a four-hour isothermal hold at each temperature. After cooling the furnace to below 200° C., the gas flow through the furnace tube was switched from hydrogen to nitrogen. The nitrogen flow was maintained until the furnace cooled to about 30° C. This effectively passivated the reduced Mo—Cu composite metal powders. The bulk as-reduced powders had a gray color similar to unalloyed Mo powders. There was no visual indication of the presence of copper in the Mo—Cu composite powders. The powders were screened −60 mesh and analyzed for Cu content, particle size distribution, and surface area. The results of the different analyses are given in Table 4.

TABLE 4

| | Mo—Cu Composite Powder Properties | | | |
|---|---|---|---|---|
| $CuMoO_4$-based Composite Oxide | Cu estimated, wt. % | Cu actual, wt. % | Median Size, μm | Surface Area, $m^2/g$ |
| $CuMoO_4$ + 11.583 $MoO_3$ | 5 | 4.9 | 18.5 | 2.13 |
| $CuMoO_4$ + 4.961 $MoO_3$ | 10 | 10.2 | 19.7 | 1.53 |
| $CuMoO_4$ + 2.753 $MoO_3$ | 15 | 15.3 | 15.7 | 1.95 |
| $CuMoO_4$ + 1.649 $MoO_3$ | 20 | 20.4 | 23.5 | 1.61 |
| $CuMoO_4$ + 0.987 $MoO_3$ | 25 | 25.9 | 22.3 | (2.06) |
| $CuMoO_4$ + 0.545 $MoO_3$ | 30 | 30.9 | 23.7 | 1.19 |
| $CuMoO_4$ + 0.230 $MoO_3$ | 35 | 36.2 | 25.1 | 1.44 |
| $CuMoO_4$ | ~40 | 41.4 | 25.4 | 1.23 |

The measured copper content of the Mo—Cu composite powders was generally about 2% to about 3.5% higher than the estimated value.

EXAMPLE 8

10 Tests were conducted on establishing the effect of the second-stage reduction temperature on properties of the resultant Mo—Cu composite powders. The starting material was the $CuMoO_4$-based composite oxide (15 wt. % Cu) which had been reduced at 300° C. in Example 6. The second-stage reduction was carried out using temperatures in the range of 700° C. to 950° C. using the same conditions as in Example 7 except the rate of temperature increase which was 20° C./min. Six reduction runs were carried out. The reduced Mo—Cu composite powders were screened −60 mesh and analyzed. The results of the analyses are presented in Table 5.

TABLE 5

| Powder Property | Reduction Temperature, ° C. | | | | | |
|---|---|---|---|---|---|---|
| | 700 | 750 | 800 | 850 | 900 | 950 |
| Particle Size Distribution, μm | | | | | | |
| $D_{90}$ | 45.4 | 47.7 | 58.0 | 52.9 | 49.2 | 44.5 |
| $D_{50}$ | 18.5 | 20.0 | 21.9 | 20.3 | 17.2 | 16.4 |
| $D_{10}$ | 3.2 | 3.6 | 4.2 | 3.2 | 3.1 | 3.3 |
| Fisher Sub-Sieve Size, μm | 2.7 | 3.1 | 3.2 | 3.1 | 2.9 | (3.5) |
| Bulk density, g/cm$^3$ | 1.15 | 1.16 | 1.13 | 1.10 | 1.10 | 1.06 |
| Oxygen Content, ppm | 3400 | 4500 | 1100 | 1100 | 1050 | 980 |
| Specific Surface Area, m$^2$/g | 4.97 | 4.08 | 1.89 | 1.06 | 0.7 | 0.57 |
| Calculated Particle Diameter, μm | 0.13 | 0.16 | 0.34 | 0.61 | 0.93 | 1.13 |

As a rule, powder agglomeration due to sintering increases with the reduction temperature. The test results demonstrate that, within a broad range of reduction temperatures, the size of the reduced Mo—Cu composite powder and its bulk density do not increase monotonically with temperature. Furthermore, there appears to be a pronounced sintering effect with increased temperature which manifests itself in a decrease in the specific surface area and, correspondingly, an increase of the calculated particle diameter (the BET particle size). Similarly, the oxygen content follows the trend of the surface area and decreases with temperature.

The bulk as-reduced Mo—Cu composite powders had a gray color similar to unalloyed Mo powders. There was no visual indication of the presence of Cu in the Mo—Cu composite powders. In order to examine the distribution of phases in the composite powders, they were analyzed by Sputtered Neutral Mass Spectrometry (SNMS) and cross-sectioned metallographic samples were analyzed by Scanning Electron Microscopy (SEM) using Secondary Electron Imaging (SEI) and Back-Scattered Electron Imaging (BEI).

Figure 2:
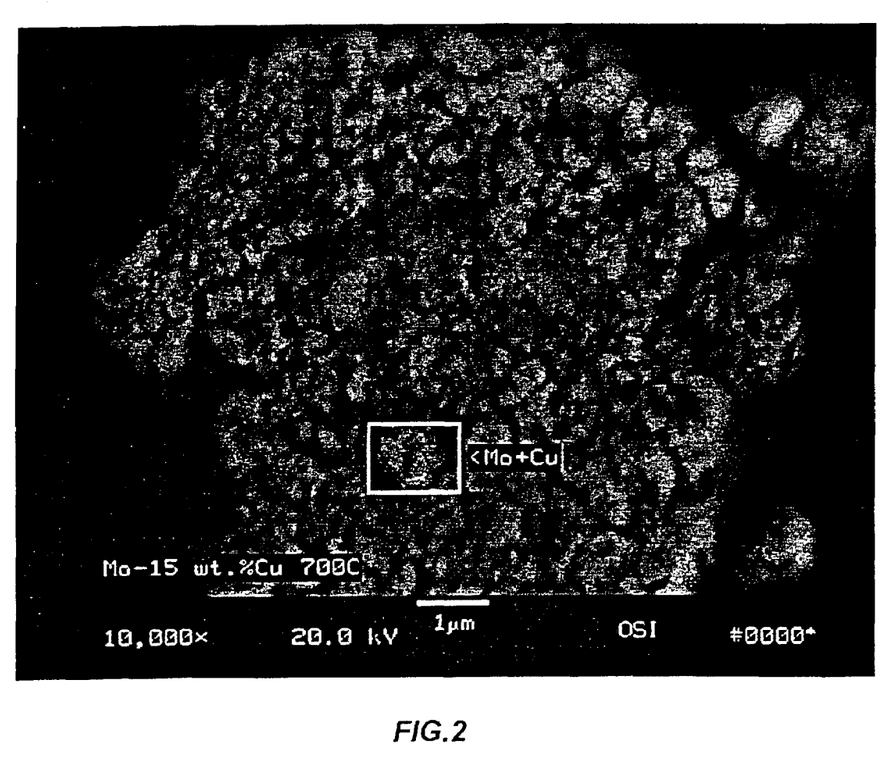
FIG. 2 is an SEM micrograph of a cross section of an agglomerate of the Mo—Cu composite powder taken using Back-Scattered Electron Imaging.
Figure 3:
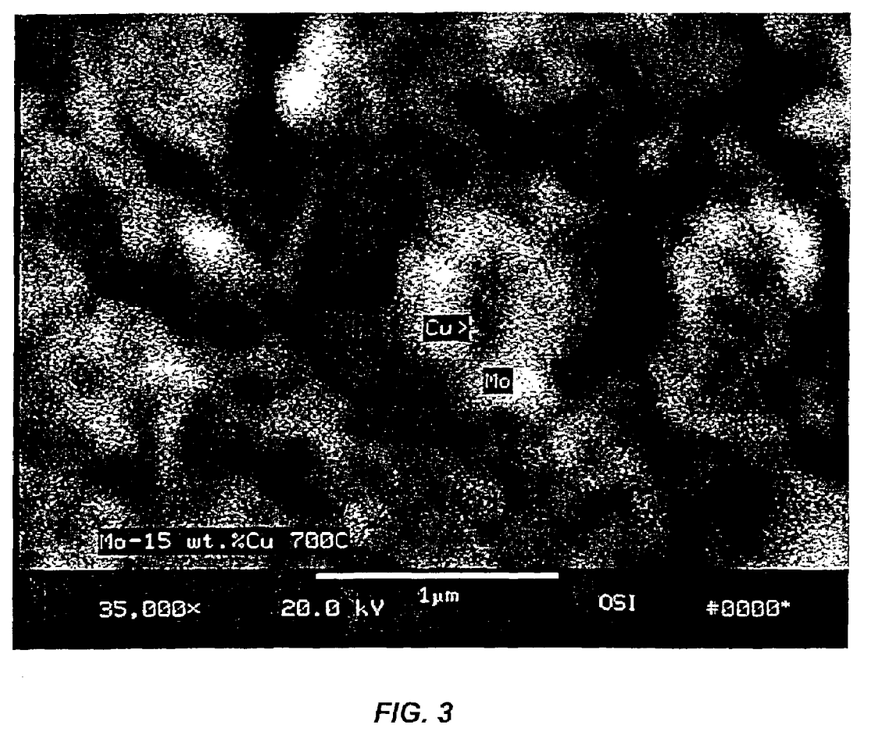
FIG. 3 is an enlargement of the finite particle outlined in the micrograph shown in FIG. 2.

The Mo—Cu composite powders of this invention were shown to consist of larger agglomerates of finite dual-phase particles comprised of a sintered molybdenum network wherein the voids in the network are filled with copper. This unique distribution of phases resulted in the substantial encapsulation of the copper phase by the molybdenum phase. As shown in the SEM micrographs, the finite particles were irregularly shaped and ranged in size from about 0.5 to about 1.5 μm. This is in relative agreement with the particle size calculated from the BET surface area. FIG. 3 (BEI) is an enlarged image of the finite particle outlined in the agglomerate shown in FIG. 2 (BEI) and demonstrates the encapsulation of the-copper phase by the molybdenum phase. The SNMS test results are consistent with the SEM observations in that they show depletion of copper at the surface of the composite powder particles and a very homogeneous distribution of phases within the powder.

EXAMPLE 9

Production scale tests were carried out using a two-stage reduction of a synthesized CuMoO$_4$-based composite oxide having a relative copper content of 15 wt. %. The first stage reduction was done in the same furnace as in Example 6 using the same loading conditions and a reduction temperature of 300° C. The end product was screened −60 mesh and subjected to the second-stage reduction in a three-zone hydrogen reduction furnace having a temperature of 900° C. in all three zones. An oxide load of about 300 g produced a bed depth of about ½" in an Inconel boat. The residence time for the material in the hot zone of the furnace was about 4 hours. After removal from the furnace, the reduced powder was immediately dumped for surface passivation into a stainless steel hopper having a nitrogen atmosphere. Surface passivation for 1 to 2 hours completely eliminated the pyrophoricity of the powder. The resulting Mo—Cu composite powder was screened −60 mesh and shown to have the following properties:

| Particle Size Distribution: | $D_{90}$ = 47.0 μm |
| --- | --- |
| | $D_{50}$ = 17.9 μm |
| | $D_{10}$ = 2.8 μm |
| Fisher Sub-Sieve Size | 2.9 μm |
| Specific Surface Area: | 1.65 m$^2$/g |
| Calculated Particle Diameter: | 0.39 μm |
| Oxygen Content: | 2700 ppm |
| Bulk Density: | 1.26 g/cm$^3$ |
| Copper Content: | 15.06 wt. % |

The size of the powder made in this Example and the powder made at 900° C. in Example 8 are very similar. However, the surface area and oxygen content are substantially higher while the BET particle size is substantially lower. This indicates that the finite particles formed in this Example are smaller than those formed in Example 8.

Consolidation of the Mo—Cu Composite Powders

The formation of a rigid Mo skeleton during solid-state sintering is beneficial to obtaining good dimensional stability of Mo—Cu pseudoalloy parts made by P/M. Mo—Cu pseudoalloys with a strong Mo skeleton resist distortion during densification even in the presence of large amounts of liquid copper. High dimensional tolerances and an absence of distortion are of particular importance for the P/M net-shape manufacturing of thermal management components (heat sinks) for microelectronic and optoelectronic applications.

In contrast to the Mo—Cu composite powders of this invention, the sintering of mechanical blends of elemental Mo and Cu powders is sluggish. High sintering temperatures (up to 1650–1670° C.) are required to sinter the P/M compacts from blended metal powders which lead to the loss of copper in the form of bleedout and evaporation from the parts. The loss of copper makes it very difficult to achieve sintered densities above 97% of theoretical density (TD). The use of sintering aids (Fe, Co, Ni) to improve the sinterability of such elemental powder blends is highly undesirable as the thermal conductivity of Mo—Cu pseudoalloys is dramatically reduced.

For the Mo—Cu composite powders of this invention, we found that the copper content and distribution of Mo and Cu phases strongly influenced the sintering conditions of the powder compacts. An inverse relationship was observed between the copper content and the sintering temperature of the compact. In particular, sintering temperatures were found to extend from the solid-state sintering region of 1050–1080° C. for compacts having a copper content in the range of 26–40 wt. % to the region of sintering in the presence of liquid copper at 1085–1400° C. for compacts having a copper content in the range of 2–25 wt. %.

Sintering in the presence of liquid copper included two steps which mimic the conventional infiltration method, viz., in-situ sintering of a molybdenum skeleton and internal infiltration of the skeleton with liquid copper. Upon the melting of copper at 1083° C., the molybdenum skeleton is internally infiltrated with liquid copper via capillary infiltration, The liquid copper is retained within the molybdenum skeleton by capillary pressure. Dissolved oxygen is removed from the molten copper at 1085–1100° C. The molybdenum skeleton is further sintered in the presence of the liquid copper to complete the densification of the pseudoalloy.

The Mo—Cu composite powders may be consolidated in as-reduced, deagglomerated, or spray-dried flowable states. A lubricant and/or binder may be mixed with the powder, or added during spray drying, to enhance powder consolidation. These materials may include for example zinc stearate, ethylene-bis-stearamide, or ethylene glycol. The Mo—Cu composite powders may be used in a number of conventional P/M consolidation methods such as mechanical or isostatic pressing, injection molding, tape forming, rolling, and screen printing for ceramic metallization.

The following are the preferred processing steps for dewaxing and sintering green compacts made from the Mo—Cu composite powders of this invention:

1. Depending on the type of wax/binder, dewax/debind the green compacts at a temperature from about 200° C. to about 450° C.;
2. Remove oxygen from the green compacts at a temperature from about 930° C. to about 960° C.;
3. Sinter a substantially dense molybdenum skeleton at a temperature from about 1030° C. to about 1050° C.;
4(a). Solid-state sinter compacts with a copper content of about 26 wt. % to about 40 wt. % at a temperature from about 1050° C. to about 1080° C.; or
4(b). Sinter compacts with a copper content of about 2 wt. % to about 25 wt. % in the presence of a liquid phase at a temperature from about 1085° C. to about 1400° C.

The Mo—Cu pseudoalloy shapes produced according to this method exhibited no copper bleedout, very good shape retention, a high sintered density (about 97% to about 99% TD), and a fine pseudoalloy microstructure (Mo grains in the range of about 1 μm to about 5 μm; copper pools in the range of about 2 μm to about 15 μm).

EXAMPLE 10

Mo-15Cu pseudoalloy samples were made from the Mo—Cu composite powder (15 wt. % Cu) made in Example 9. To enhance consolidation, the powder was blended with 0.5 wt. % ethylene-bis-stearamide, a solid lubricant made under the trade name of Acrawax C by Lonza, Inc. in Fair Lawn, N.J. The powder was mechanically pressed at 70 ksi into flat samples (33.78×33.78×1.62 mm) having a green density of about 62% TD. To assure uniform heat transfer to samples during dewaxing and sintering, the samples were processed in pure alumina sand. Thermal processing was done in flowing hydrogen in a laboratory furnace with an alumina tube. To prevent cracking of the tube by thermal stresses, the heating/cooling rate was limited to 2° C./min. The sintering cycle included: 1-hour isothermal holds at 450 and 950° C. for removing the powder lubricant and surface oxygen; a 1-hour isothermal hold at 1040° C. for in-situ sintering of a molybdenum skeleton; a 2-hour isothermal hold at 1100° C. for internal infiltration of the skeleton with liquid copper, removal of dissolved oxygen from molten copper, and presintering the samples; and a 2-hour isothermal hold at 1230° C. for final densification of the samples. The latter temperature was experimentally determined on the basis of obtaining the highest pseudoalloy density without causing copper bleedout by oversintering the molybdenum skeleton.

In several consecutive runs (3 samples per run), the as-reduced Mo-15Cu powder demonstrated very good sinterability, an absence of copper bleedout, and good shape retention of the sintered compacts. The average linear shrinkage was 15%, and the average values of the sintered density and electrical conductivity were in the range of, correspondingly, 98.8–99.0% TD and 36.6–36.7% IACS.

The thermal conductivity of the sintered samples was determined from reported correlations between the electrical and thermal conductivity in Mo—Cu pseudoalloys. For an infiltrated Mo-15Cu pseudoalloy, an electrical resistivity of 51.0 nΩ·m (equivalent to an electrical conductivity of 33.8% IACS) corresponds to a thermal conductivity of 166 W/m·K. A measured 1.085× increase in electrical conductivity for the samples made from the Mo-15Cu composite powder raised the thermal conductivity of the samples to a substantially higher level of about 180 W/m·K.

Figure 4:
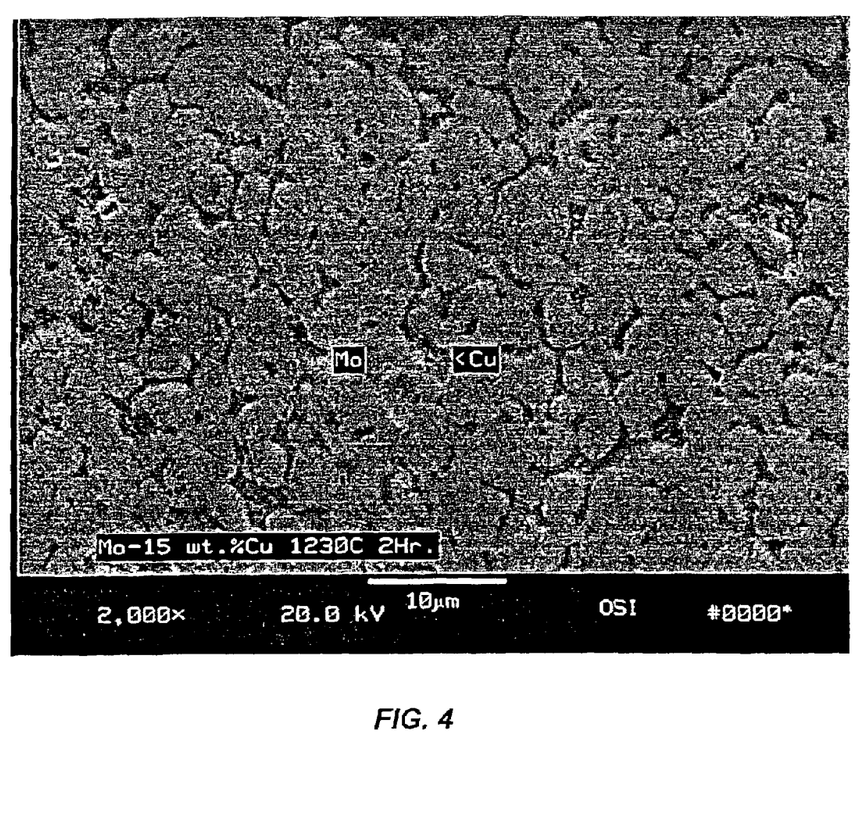
FIG. 4 is an SEM micrograph of a cross section of a Mo-15Cu pseudoalloy.

An SEM micrograph of a cross section of one of the Mo-15Cu pseudoalloy samples is shown in FIG. 4. The molybdenum skeleton of the pseudoalloy is formed by mostly rounded, highly interconnected grains whose distribution, order and size have been affected by regrouping and limited growth in the presence of the liquid phase. The size of the grains is in the range of about 1 to about 5 microns. Rounded interconnected grains are indicative of a sintering mechanism consisting of particle rearrangement in the presence of a liquid phase and grain shape accommodation aided by the minute solubility of molybdenum in liquid copper at the sintering temperature. The average size of the Cu pools is in the range of about 2 to about 15 microns. Deagglomeration of the as-reduced powder before sintering is expected to substantially improve the microstructural homogeneity of the P/M pseudoalloy.

EXAMPLE 11

Mo-40Cu pseudoalloy samples were made from the Mo—Cu composite powder (40 wt. % Cu) made in Example 7. Samples were pressed using the same conditions as in Example 10. The higher copper content substantially improved the pressibility of samples which exhibited a green density of 73% TD. As in Example 10, the temperature for the final densification was experimentally determined on the basis of obtaining the highest pseudoalloy density without causing copper bleedout by oversintering the molybdenum skeleton. It was established that the high copper content limited the final densification temperature to 1065° C. thus bringing it into the solid-state sintering region.

In two consecutive runs (3 samples per run), the as-reduced Mo-40Cu powder demonstrated very good sinterability and shape retention of the sintered compacts. The average linear shrinkage was 9%, and the average values of the sintered density and electrical conductivity were in the range of, correspondingly, 97.8–97.9% TD and 50.7–51.0% IACS. The lower linear shrinkage compared to that for Mo-15Cu samples in Example 10 can be explained by the fact that the Mo-40Cu samples were pressed to a higher green density and consolidated to a lower sintered density.

Figure 5:
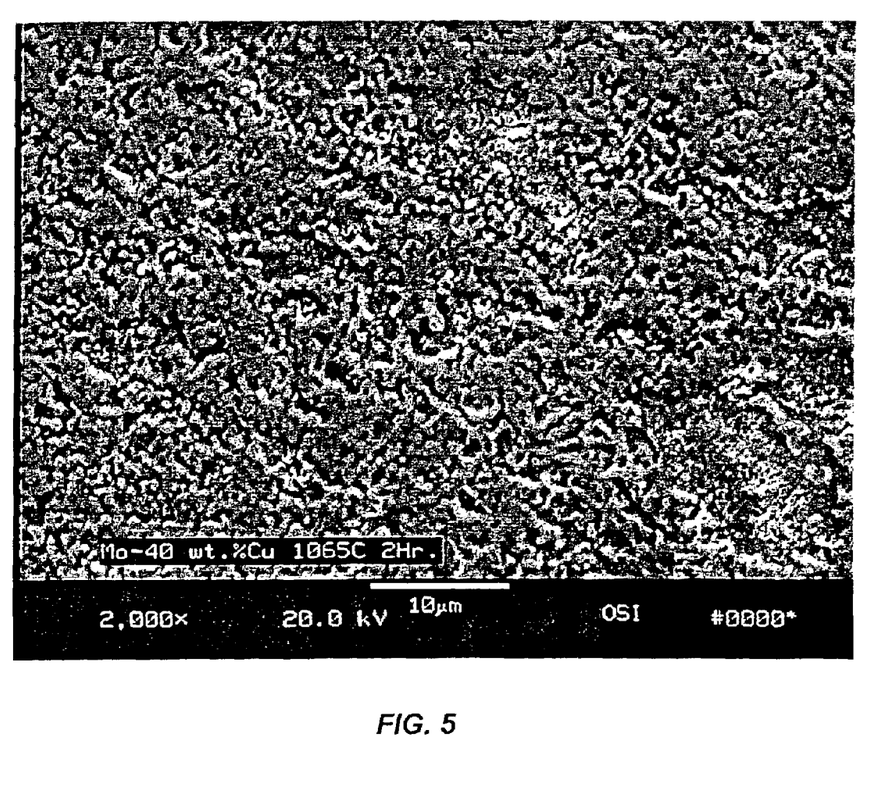
FIG. 5 is an SEM micrograph of a cross section of a Mo-40Cu pseudoalloy.

An SEM micrograph of a cross section of a Mo-40Cu pseudoalloy sample is shown in FIG. 5. By comparing the micrographs in FIGS. 4 and 5, a dramatic difference between the solid-state sintering and sintering in the presence of liquid phase becomes evident. The molybdenum skeleton, that has been sintered in-situ at 1040° C., has only slightly changed during sintering at 1065° C. The clusters of Mo particles, whose size and geometry have been barely affected by sintering, are indicative of the absence of the particle rearrangement and the size accommodation sintering mechanisms that are operational only in the presence of a liquid phase. Correspondingly, the microstructure of the solid-state sintered pseudoalloy is less orderly (more clusters of Mo particles, larger Cu pools) than the microstructure of the pseudoalloy sintered in the presence of the liquid phase. However, the high sintered density of the solid-state sintered material indicates that deagglomeration of the as-reduced Mo-40Cu powder before sintering may substantially improve the microstructural homogeneity of the P/M pseudoalloy.

While there has been shown and described what are at the present considered the preferred embodiments of the invention, it will be obvious to those skilled in the art that various changes and modifications may be made therein without departing from the scope of the invention as defined by the appended claims.

We claim:

1. A method of making a $CuMoO_4$-based composite oxide powder comprising:
   (a) forming a mixture of a molybdenum oxide and a copper oxide, the molybdenum oxide being selected from ammonium dimolybdate, ammonium paramolybdate, or molybdenum dioxide; and
   (b) firing the mixture at a temperature and for a time sufficient to form the $CuMoO_4$, based composite oxide.

2. The method of claim 1 wherein a stoichiometric excess of up to 4 wt. % copper oxide is added to the mixture.

3. The method of claim 1 wherein the copper oxide is selected from cuprous oxide or cupric oxide.

4. The method of claim 1 wherein the $CuMoO_4$-based composite oxide has a general formula of $CuMoO_4+xMoO_3$ where x is from about 29 to 0.

5. The method of claim 1 wherein the mixture is fired at a temperature from about 650° C. to about 750° C. for about 5 hours.

6. The method of claim 5 wherein a stoichiometric excess of up to 4 wt. % copper oxide is added to the mixture.

7. The method of claim 6 wherein the copper oxide is selected from cuprous oxide or cupric oxide.

8. The method of claim 5 wherein the $CuMoO_4$-based composite oxide has a general formula of $CuMoO_4+xMoO_3$ where x is from about 29 to 0.

* * * * *